US007970778B2

(12) United States Patent
Chancey et al.

(10) Patent No.: US 7,970,778 B2
(45) Date of Patent: Jun. 28, 2011

(54) AUTOMATICALLY PERSISTING DATA FROM A MODEL TO A DATABASE

(75) Inventors: Raphael P. Chancey, Leander, TX (US); Eduardo T. Kahan, Longwood, FL (US)

(73) Assignee: International Business Machines Corporation, Armonk, NY (US)

( * ) Notice: Subject to any disclaimer, the term of this patent is extended or adjusted under 35 U.S.C. 154(b) by 683 days.

(21) Appl. No.: 12/013,865

(22) Filed: Jan. 14, 2008

(65) Prior Publication Data
US 2009/0182752 A1 Jul. 16, 2009

(51) Int. Cl.
G06F 7/00 (2006.01)
G06F 17/30 (2006.01)
(52) U.S. Cl. ........ 707/755; 707/756; 707/802; 707/803; 707/810; 715/230; 715/232; 717/104; 717/108; 717/166
(58) Field of Classification Search .................. 707/755, 707/756, 802, 803, 810; 715/513, 763, 230, 715/232; 717/104, 105, 108
See application file for complete search history.

(56) References Cited

U.S. PATENT DOCUMENTS

| | | | | |
|---|---|---|---|---|
| 6,826,568 | B2* | 11/2004 | Bernstein et al. | 707/749 |
| 7,293,254 | B2* | 11/2007 | Bloesch et al. | 717/108 |
| 7,389,304 | B2* | 6/2008 | Boyer et al. | 707/999.102 |
| 7,739,316 | B2* | 6/2010 | Thompson et al. | 707/825 |
| 2008/0163160 | A1* | 7/2008 | Bloesch et al. | 717/104 |
| 2008/0168420 | A1* | 7/2008 | Sabbouh | 717/104 |
| 2009/0012993 | A1* | 1/2009 | Conn et al. | 707/103 R |
| 2009/0138844 | A1* | 5/2009 | Halberstadt et al. | 717/104 |

OTHER PUBLICATIONS

Michael Gertz & Kai-Uwe Satter—"Integrating Scientific Data Through External, Concept-Based Annoations"—Efficiency and Effectiveness of XML tools and techniques and data integration over the web, Lecture Notes in Computer Science, 2003, vol. 2590 (LNSC-2590) (pp. 220-240).*
Concas et al.—"XMI for XP Project data Interchange"—proceedings of the 2004 workshop on Quantative Techniques for Software Agile Process (SWAP'04) Nov. 5, 2004 ACM (pp. 53-58).*
Simons et al.—"Modeling Context in Mobile Distributed Systems with the UML"—Journal of Visual Languages and Computing, vol. 18, No. 4, Aug. 2007 (pp. 420-439).*
Agrawal, R. et al., "ODE (Object Database and Environment): the language and the data model", *ACM* vol. 18, Issue 2, http://doi.acm.org/10.1145/66926.66930,(1989),36-45.

* cited by examiner

*Primary Examiner* — John Breene
*Assistant Examiner* — Anh Ly
(74) *Attorney, Agent, or Firm* — DeLizio Gilliam, PLLC

(57) ABSTRACT

Projects often involve multiple teams of developers in different locations. The different teams make updates to a central or shared database(s) that can store information about the project, such as progress. Each team or even different members of the different teams can check out instances of a representation of a model for the project. The different teams/members can independently modify their instance with data specific to that member and/or team. Database operations embedded in the individual instances are then executed on the database(s) to persist the data from their individual instances to the database(s). Database mechanisms can handle locking and/or conflicts that may arise from performance of the database operations. A manager can then request a report from the database(s), and the report with data from the different members and/or teams can be generated from the database(s).

16 Claims, 4 Drawing Sheets

AUTOMATICALLY PERSISTING DATA FROM A MODEL TO A DATABASE

TECHNICAL FIELD

Embodiments of the inventive subject matter generally relate to the field of data persistence and modeling, and, more particularly, to persisting data from an instance of a model to a database.

BACKGROUND

The Unified Modeling Language™ (UML™) is the industry-standard language for specifying, visualizing, constructing, and documenting artifacts of software systems. One of the visual depictions of models created in accordance with UML is a class diagram. A class diagram represents classes, attributes of the classes, and relationships between classes.

SUMMARY

Embodiments of the inventive subject matter include a method for automatically persisting data from an instance of a representation of a model to a database. The method comprises fetching an instance of a representation of a model. The instance of the model representation is comprised of a plurality of elements. A first element of the plurality of elements is annotated with a database operation for execution on a database, and data to persist from the instance of the model representation to the database. The database has a schema defined to be congruous with the model. The first element is indicated as having data to persist to the database. The instance of the model representation is used to automatically persist the data from the instance of the model representation to the database.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to annotation, database operations and/or data to be persisted to a database may be embedded as an attribute or tagged value in an element of an instance of a representation of a model. In other instances, well-known instruction instances, protocols, structures and techniques have not been shown in detail in order not to obfuscate the description.

A model can be used to persist data to a database. Using a mapping file or creating custom code, however, persists the data in a rigid manner. If using a mapping file, whoever maintains the mapping file must be informed of any changes to the database schema. If custom code is used, then whoever maintains the custom code must be informed of changes to the model by the topology architect. Embedding database operations in elements of an instance of a model representation allows data to persist from a model to a database with flexibility.

Projects often involve multiple teams of developers in different locations. The different teams make updates to a central or shared database(s) that can store information about the project, such as progress. Each team or even different members of the different teams can check out instances of a representation of a model for the project. The different teams/members can independently modify their instance with data specific to that member and/or team. Database operations embedded in the individual instances are then executed on the database(s) to persist the data from their individual instances to the database(s). Database mechanisms can handle locking and/or conflicts that may arise from performance of the database operations. A manager can then request a report from the database(s), and the report with data from the different members and/or teams can be generated from the database(s).

Figure 1:
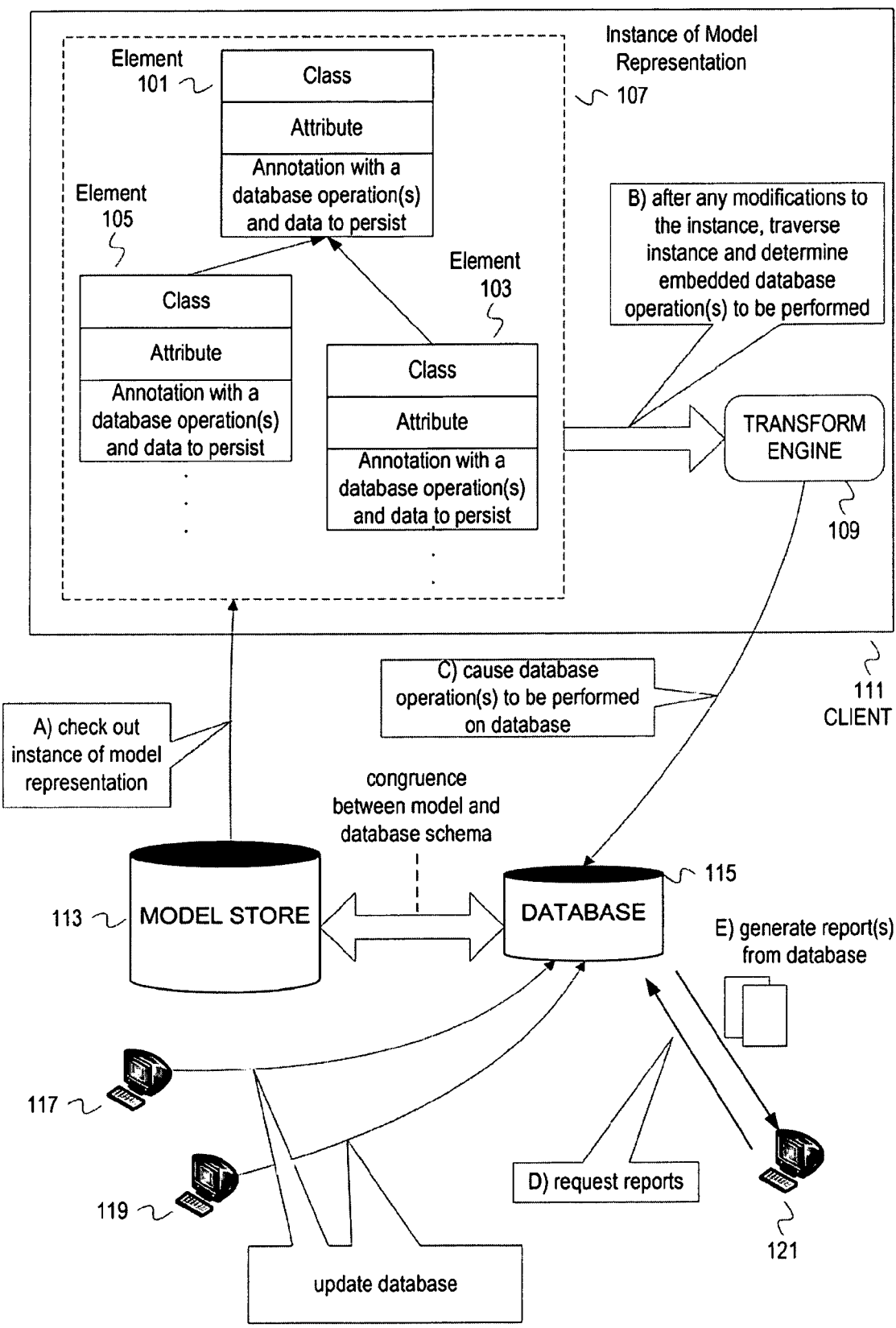
FIG. 1 depicts an example conceptual diagram of data persistence from a model representation instance to a database.

FIG. 1 depicts an example conceptual diagram of data persistence from a model representation instance to a database. In FIG. 1, clients 111, 117, and 119 make updates to a database 115. The updates involve multiple stages, but the stages are only illustrated for the client 111 in FIG. 1. At a stage A, the client 111 checks out an instance 107 of a representation of a model from a model store 113. The design of the model is congruous with a schema of the database 115.

The model representation instance 107 includes a plurality of elements 101, 103, and 105 for class objects. Each element 101, 103, and 105 indicates a class, one or more attributes for the class, and one or more annotations. One or more database operations are embedded in each of the annotations. Data to persist to the database 115 is also embedded in the annotations. The annotation can be made automatically or manually. Some or all of the annotations may exist in the instance 107 as checked out from the model store 113. A user or process can then modify, add, and/or remove annotations at the client 111. Although not depicted, the instance 107 may also have rules and/or custom logic to be applied. As with the annotations, a user and/or process can modify, add, and/or delete rules and/or custom logic in the instance 107.

At a stage B, a transform engine 109 walks over the instance 107 to determine any elements marked or indicated as having data to persist to the database. An element can be marked, for example, with a stereotype, a flag, etc. The transform engine 109 determines the database operations embedded in the elements of the instance 107, including the elements 101, 103, and 105.

The transform engine 109 then causes the determined database operations to be performed on a database 115 at a stage C. The schema of the database 115 is congruous with the model. The transform engine 109 can cause the database operations to be performed with different techniques. For instance, the transform engine 109 can execute the database operations directly. As another example, the transform engine can pass the database operations to another process or make calls to an application programming interface. Performing the embedded database operations allows the data to persist from the instance 107 to the database 115.

The stages A, B, and C are performed at the clients 117 and 119, as well as 111 using instances of the model representation fetched from the model store 113. With the data persisted to the database 115 from the client 111, 117 and 119, reports can be generated with the data persisted from the various independent instances of the model representation. At a stage D, a client 121 requests a report based on the data in the database 115. At a stage E, one or more reports are generated from the database 115.

It should be understood that the example depicted in FIG. 1 is meant to aid in understanding embodiments and should not be used to limit embodiments. For instance, embodiments are not limited to client devices. The functionality described in FIG. 1 may be performed on server devices, devices that operate as both client and server, etc. As another example, it is not necessary for different devices to automatically persist data from a model to a database and to request reports. Although not limited to a single device, a single device can both automatically persist data from a model to a database and generate a report from the database.

Figure 2:
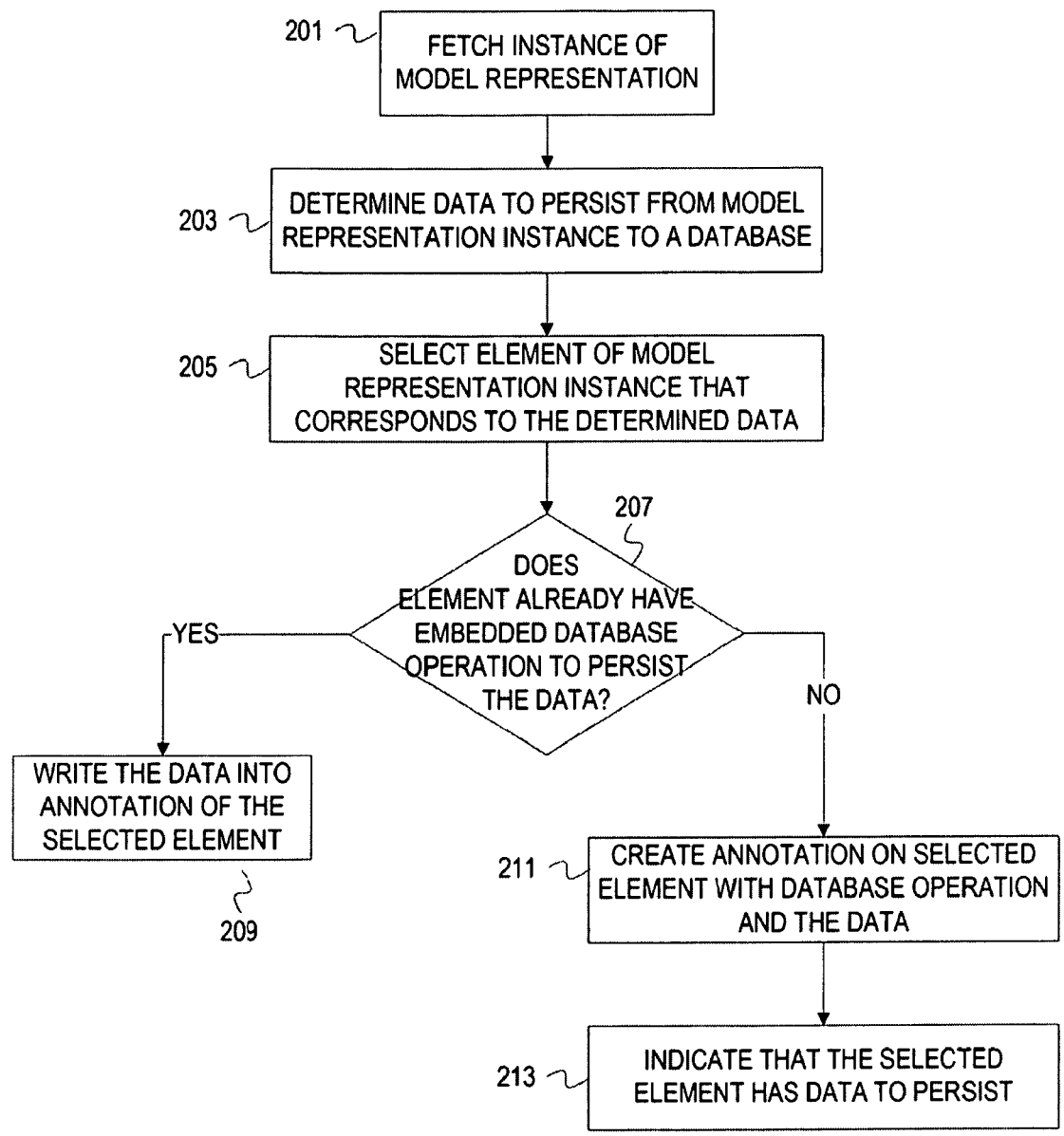
FIG. 2 depicts a flowchart of example operations for annotating a model representation instance with a database operation.

FIG. 2 depicts a flowchart of example operations for annotating a model representation instance with a database operation. At block 201, an instance of a model representation is fetched. For example, as depicted in FIG. 1, an instance may be checked out from shared repository of model representations. At block 203, data to persist from the model representation instance to a database is determined. For example, data may be read from a file, read from a script, input by a user, previously selected, etc. At block 205, an element of the model representation instance is selected. The selected element corresponds to the determined data. For example, a user selects an element in the model representation instance to annotate. In another example, heuristics are used by a process or thread to search for an element with attributes that correspond to the data. At block 207, it is determined if the selected element already has an embedded database operation to persist the determined data. To illustrate, the element is read by a process or thread to determine if the element is annotated with a database operation. The process or thread then determines if the database operation can and/or should be used to persist the determined data. If the selected element has an embedded database operation to persist the data, then control flows to block 209. Otherwise, control flows to blocks 211.

At block 209, the data is written into the annotation of the selected element. For instance, the already embedded database operation is modified to write the determined data to the target database.

At block 211, an annotation is created on the selected element. The annotation is created with a database operation and the determined data. Embodiments can use different techniques to annotate the selected element (e.g., write the database operation with the data, write the database operation and the data separately, write the database operation with a reference to the data, etc.). At block 213, it is indicated that the selected element has data to persist. For example, the selected element is marked with a flag. As another example, a process or thread sets a tagged value in the selected element or defines a stereotype. The stereotype indicates the element has data to persist to a database.

Figure 3:
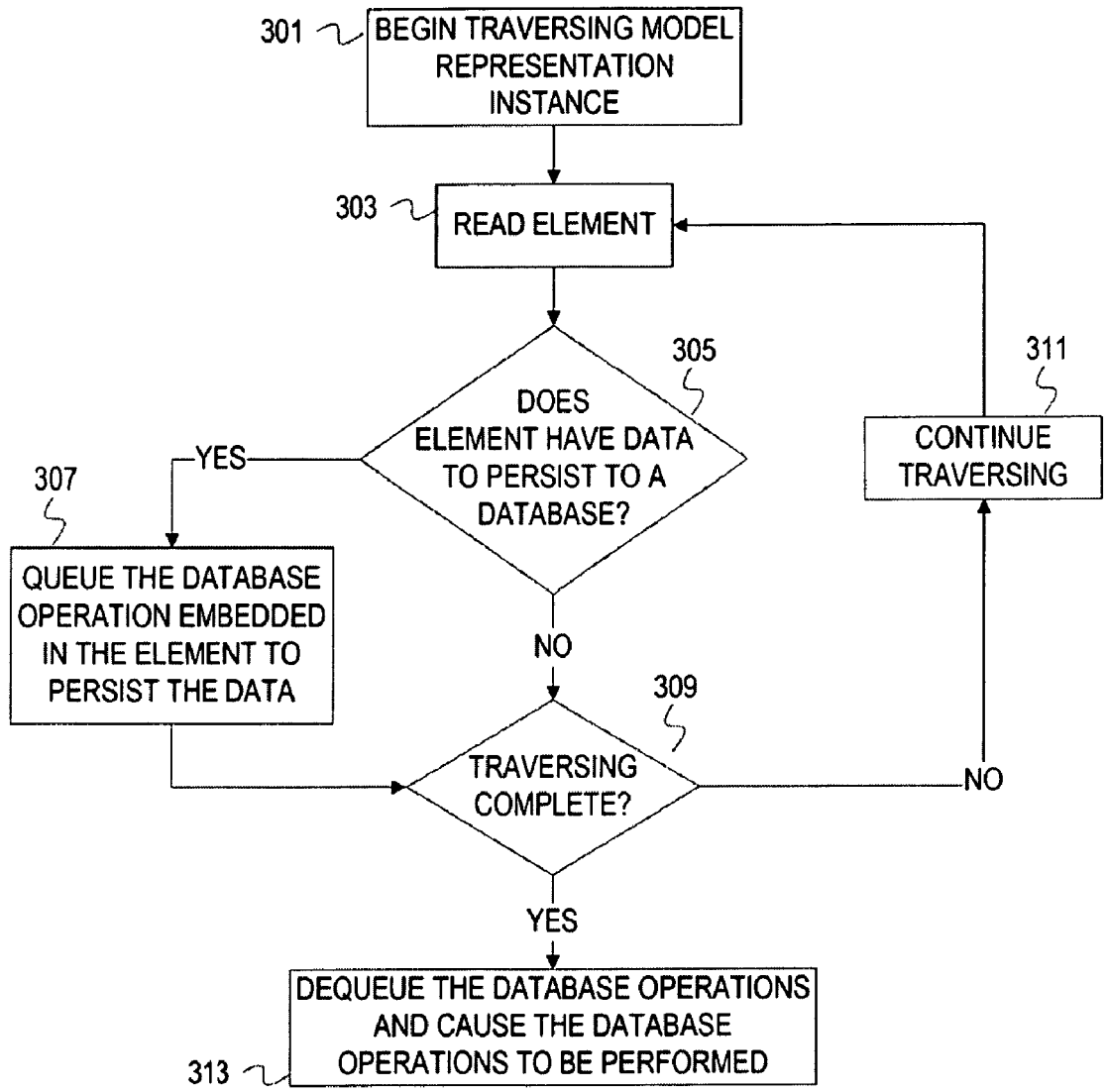
FIG. 3 depicts a flowchart of example operations for traversing a model representation instance.

FIG. 3 depicts a flowchart of example operations for traversing a model representation instance. At block 301, traversal of a model representation instance begins. Embodiments can various traversal techniques (e.g., depth first, breadth first, etc.). At block 303, an element of the model representation instance is read. At block 305, it is determined if the element has data to persist to a database. For instance, a process or thread encounters an attribute or stereotype that indicates persistable for the element. If the element does not have data to persist, then control flows to block 309. If the element has data to persist to the database, then control flows to block 307.

At block 307, a database operation embedded in the element is queued. Control flows from block 307 to block 309.

At block 309, it is determined if the traversal is complete. If the traversal is complete, then control flows to block 313. If not, then control flows to block 311.

At block 311, traversal continues. Control flows from block 311 to block 303.

At block 313, the queued database operations are dequeued and caused to be performed.

The example operation in the depicted flowcharts are intended to aid in understanding embodiments and should not construed as limiting embodiments. Embodiments may perform additional operations, fewer operations, and/or different operations. For instance, referring to FIG. 3, the embedded database operations may be executed as they are encountered. In another embodiment, a process or thread scans the queue of database operations to optimize the database operations (e.g., locate and eliminate redundant operations). In another embodiment, a list of references can be maintained for each element with persistable data instead or in addition to marking the elements.

The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing ("machine-readable storage medium") or transmitting ("machine-readable signal medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in a machine-readable signal medium, examples of which include an electrical, optical, acoustical or other form of propagated signal (e.g., carrier waves, infrared signals, digital signals, etc.), or wireline, wireless, or other communications medium.

Figure 4:
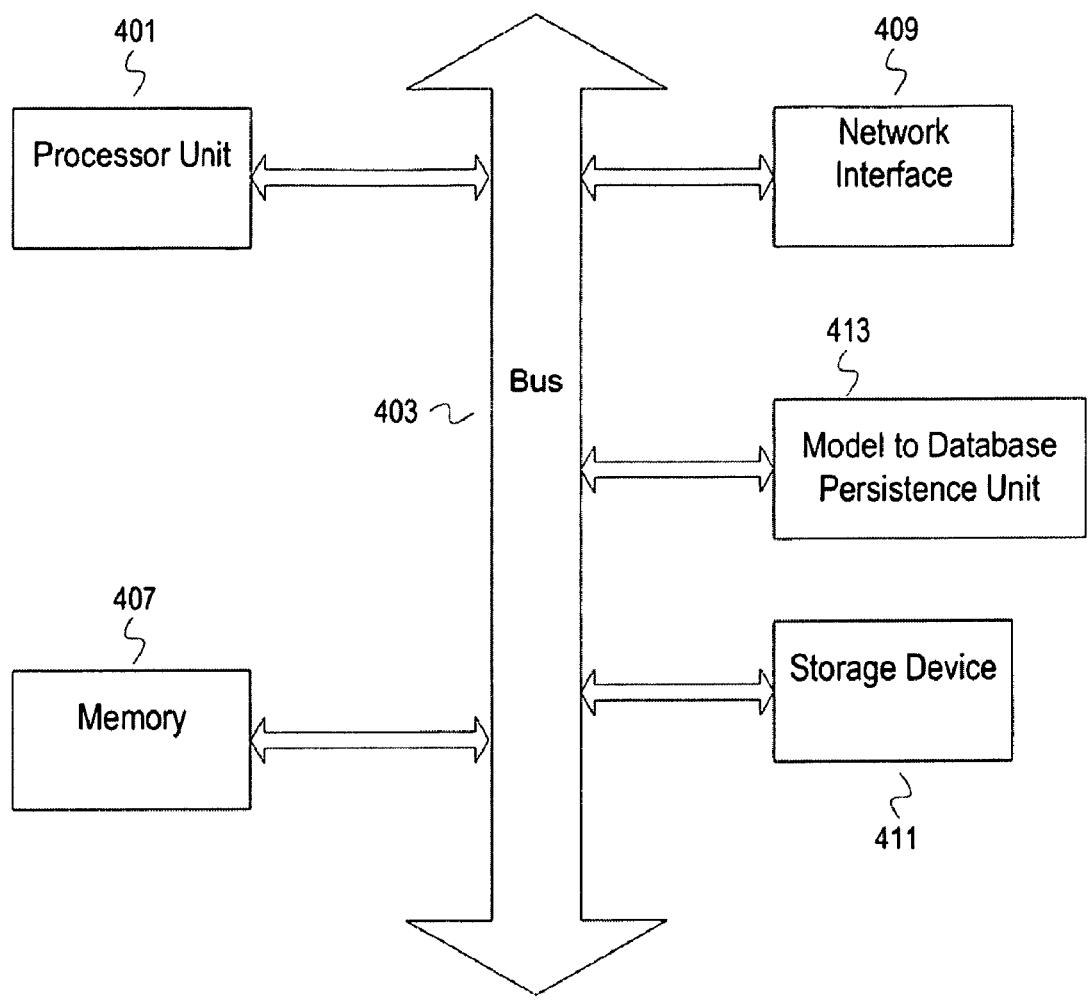
FIG. 4 depicts an example computer system.

FIG. 4 depicts an example computer system. A computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport®, InfiniBand®, NuBus, etc.), a network interface 409 (e.g., an ATM interface, an Ethernet interface, a Frame Relay interface, SONET interface, wireless interface, etc.), and a storage device(s) 411 (e.g., optical storage, magnetic storage, etc.). The computer system includes a model to persistence unit 413 that is operable to persist data from an instance of a model representation to a database in accordance with the above described functionalities. Any one of these functionalities may be partially (or entirely) implemented in hardware and/or on the processing unit 401 in addition to or instead of the separate model to database persistence unit 413. For example, the functionality may be implemented with an application specific integrated circuit, in logic implemented in the processing unit 401, in a co-processor on a peripheral device or card, etc. In addition, the memory 407 can embody some or all of these functionalities. Further, realizations may include fewer or additional components not illustrated in FIG. 4 (e.g., video cards, audio cards, additional network interfaces, peripheral devices, etc.). The processor unit 401, the storage device(s) 411, and the network interface 409 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for automatically persisting data from a model representation instance to a database as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   fetching an instance of a representation of a model, the instance of the model representation comprised of a plurality of elements, where each of the plurality of elements indicates a class and one or more attributes of class;
   creating an annotation in a first element of the plurality of elements wherein the annotation comprises a database operation for execution on a database and data to persist from the instance of the model representation to the database with the database operation, the database having a schema defined to be congruous with the model;
   indicating that the first element has data to persist to the database;
   using the instance of the model representation to automatically persist the data from the instance of the model representation to the database.

2. The method of claim 1 further comprising modifying data in a second element to create modified data and using the instance of the model representation to automatically persist the modified data to the database.

3. The method of claim 2 wherein said modifying the data comprises modifying a second database operation embedded in the second element.

4. The method of claim 1, wherein said using the instance of the model representation comprises at least one of executing the database operation and passing the database operation to a process that executes database operation.

5. The method of claim 1, wherein the model is defined in accordance with the unified modeling language.

6. The method of claim 1, wherein said indicating comprises indicating a stereotype defined in a parent element as having data to persist to the database, wherein the parent element is one of the plurality of elements and is a direct or indirect parent of the first element.

7. The method of claim 1 further comprising:
   determining those of the plurality of elements indicated as having data to persist to the database.

8. A method comprising:
   determining that a subset of a plurality of elements of an instance of a representation of a model have data to persist to a database, where each of the plurality of elements indicates a class and at least one attribute of the class and wherein each of the subset of the plurality of elements also have at least one database operation embedded therein;
   determining the at least one database operation embedded in each of the subset the of the plurality of elements for execution on a database to persist the data from the instance of the model representation to the database, wherein the database is defined with a schema that is congruous with the model; and
   causing the at least one database operation of each of the subset of the plurality of elements to be executed on the database.

9. The method of claim 8, wherein said causing the at least one database operation to be executed comprises executing the at least one database operation or passing the at least one database operation to a process that executes database operations.

10. One or more machine-readable storage media having stored therein a program product, which when executed by a set of one or more processor units causes the set of one or more processor units to perform operations that comprise:
    fetching an instance of a representation of a model, the instance of the model representation comprised of a plurality of elements, where each of the plurality of elements indicates a class and one or more attributes of the class;
    creating an annotation in a first element of the plurality of elements, wherein the annotation comprises a database operation for execution on a database and data to persist from the instance of the model representation to the database with the database operation, the database having a schema defined to be congruous with the model;
    indicating that the first element has data to persist to the database;
    using the instance of the model representation to automatically persist the data from the instance of the model representation to the database.

11. The machine-readable storage media of claim 10, wherein the operations further comprise modifying data in a second element to create modified data and using the instance of the model representation to automatically persist the modified data to the database.

12. The machine-readable storage media of claim 11, wherein said operation of modifying the data comprises modifying a second database operation embedded in the second element.

13. The machine-readable storage media of claim 10, wherein said operation of using the instance of the model representation comprises at least one of executing the database operation and passing the database operation to a process that executes database operation.

14. The machine-readable storage media of claim 10, wherein the model is defined in accordance with the unified modeling language.

15. An apparatus comprising:
- a set of one or more processor units; and
- a machine-readable storage medium having program instructions stored therein, the program instructions embodying a model-to-database persistence unit, the model-to-database persistence unit operable to, determine that a subset of a plurality of elements of an instance of a representation of a model have data to persist to a database, where each of the plurality of elements indicates a class and at least one attribute of the class and wherein each of the subset of the plurality of elements also have at least one database operation embedded therein;

determine the at least one database operation embedded in each of the subset of the plurality of elements for execution on a database to persist the data from the instance of the model representation to the database, wherein the database is defined with a schema that is congruous with the model; and cause the at least one database operation of each of the subset of the plurality of elements to be executed on the database.

16. The apparatus of claim 15 further comprising a network interface operable to facilitate the at least one database operation being performed on the database.

* * * * *